US008931907B2

(12) United States Patent
Ueno et al.

(10) Patent No.: US 8,931,907 B2
(45) Date of Patent: Jan. 13, 2015

(54) PROJECTING DEVICE FOR DETECTING BRIGHTNESS REGIONS OF A PROJECTING SURFACE AND PROJECTING METHOD THEREFOR

(75) Inventors: Yasuhiro Ueno, Yokohama (JP); Yasushi Kitamura, Yokohama (JP); Jouji Yoshikawa, Yokohama (JP)

(73) Assignee: Kyocera Corporation, Kyoto (JP)

( * ) Notice: Subject to any disclaimer, the term of this patent is extended or adjusted under 35 U.S.C. 154(b) by 385 days.

(21) Appl. No.: 13/498,369

(22) PCT Filed: Sep. 27, 2010

(86) PCT No.: PCT/JP2010/066728
§ 371 (c)(1),
(2), (4) Date: Mar. 27, 2012

(87) PCT Pub. No.: WO2011/037237
PCT Pub. Date: Mar. 31, 2011

(65) Prior Publication Data
US 2012/0182307 A1 Jul. 19, 2012

(30) Foreign Application Priority Data

Sep. 28, 2009 (JP) ................................. 2009-223506

(51) Int. Cl.
*G03B 21/00* (2006.01)
*G09G 3/30* (2006.01)
*H04N 5/57* (2006.01)
*G03B 21/14* (2006.01)
*H04N 9/77* (2006.01)
(Continued)

(52) U.S. Cl.
CPC .................. *G03B 21/14* (2013.01); *H04N 9/77* (2013.01); *H04N 5/2354* (2013.01); *H04N 5/57* (2013.01);

(58) Field of Classification Search
CPC ....... G03B 21/14; H04N 9/3182; H04N 9/77; H04N 5/2354; H04N 5/57; G09G 2320/0626; G09G 2320/0233; G09G 2320/0686
USPC .............. 353/122; 345/77; 348/687; 382/274
See application file for complete search history.

(56) References Cited

U.S. PATENT DOCUMENTS

2007/0040989 A1*  2/2007  Weng et al. ..................... 353/30
2007/0091434 A1*  4/2007  Garner et al. ................. 359/459
(Continued)

FOREIGN PATENT DOCUMENTS

JP        2005195904 A       7/2005
JP        2006091110 A       4/2006
(Continued)

OTHER PUBLICATIONS

International Search Report and Written opinion for PCT/JP2010/066728 dated Oct. 19, 2010.

*Primary Examiner* — Georgia Y Epps
*Assistant Examiner* — Magda Cruz
(74) *Attorney, Agent, or Firm* — Lowe Hauptman & Ham, LLP

(57) ABSTRACT

According to an aspect, a projector device includes an image projecting unit and a control unit. The image projecting unit projects an image. The control unit acquires brightness information of regions included in a projection surface on which the image projecting unit can project the image, and causes the image projecting unit to project, based on the brightness information of the regions, the image on a low-brightness region, among the regions, whose brightness is lower than that of another region.

16 Claims, 9 Drawing Sheets

(51) Int. Cl.
*H04N 5/235* (2006.01)
*H04N 9/31* (2006.01)
*G09G 3/00* (2006.01)

(52) U.S. Cl.
CPC ........... *H04N 9/3182* (2013.01); *H04N 9/3194* (2013.01); *H04N 9/3197* (2013.01); *G09G 3/002* (2013.01); *G09G 2320/0233* (2013.01); *G09G 2320/0693* (2013.01); *G09G 2320/08* (2013.01); *G09G 2340/0492* (2013.01); *G09G 2340/14* (2013.01); *G09G 2360/14* (2013.01)
USPC .............. 353/122; 345/77; 348/687; 382/274

(56) References Cited

U.S. PATENT DOCUMENTS

| | | |
|---|---|---|
| 2008/0259289 A1 | 10/2008 | Nozaki et al. |
| 2009/0147224 A1 | 6/2009 | Kurozuka et al. |
| 2011/0018897 A1 | 1/2011 | Uchiyama et al. |

FOREIGN PATENT DOCUMENTS

| | | |
|---|---|---|
| WO | 2007034875 A1 | 3/2007 |
| WO | 2009088080 A1 | 7/2009 |

\* cited by examiner

PROJECTING DEVICE FOR DETECTING BRIGHTNESS REGIONS OF A PROJECTING SURFACE AND PROJECTING METHOD THEREFOR

CROSS-REFERENCE TO RELATED APPLICATION

This application is a National Stage of International Application Number PCT/JP2010/066728 filed on Sep. 27, 2010, which designates the United States, and which is based upon and claims the benefit of priority from Japanese Patent Application No. 2009-223506, filed on Sep. 28, 2009.

FIELD

The present disclosure relates to a projector device that includes an image projecting unit to project an image and a projecting method thereby.

BACKGROUND

Conventionally, there have been devices called projectors for projecting images on wall surfaces and screens. The most common projectors are known as stationary projectors, which receive power from a commercial power supply and are fixed to a certain position when they operate. Stationary projectors project, when they are fixed, an image on a fixed position on a wall surface or a screen. In contrast, portable projectors have been proposed recently that are small and easy to carry. In contrast to stationary projectors, for which there is an assumption that they will keep projecting an image on a fixed position, portable projectors can be carried around and have an advantage in that a position irradiated with an image is easily adjustable by manual operation.

A portable projector is described in the patent literature 1 that includes a projecting unit that projects an image including a predetermined shape pattern onto a projection surface, thereby creating a projection image of the image; an imaging unit that acquires a taken image of a subject; and a brightness adjusting unit that adjusts, based on the predetermined shape pattern included in the taken image of the projection image that is taken and acquired by the imaging unit, the brightness of the projection image.

CITATION LIST

Patent Literature

Patent Literature 1: Japanese Patent Application Laid-open No. 2006-91110

Technical Problem

Because a portable projector is easy to carry around and the angle of the device (housing) is changed easily, there is the possibility that it projects an image on projection surfaces under various conditions. Regarding this point, the device described in the patent literature 1 determines a projection condition by taking a photo of an image that is projected by the projecting unit and then adjusts the brightness based on the determination result. Therefore, it is possible to adjust the brightness at which an image is projected.

However, when the projection surface on which a portable projector projects an image is considered, various conditions are assumed and, in some conditions, even when the intensity of projecting light is adjusted, an image may become difficult to view. This will occur, for example, when an image is projected on a surface vertically downward, such as a table and a floor, in a room. In this case, both a region of shadows of various objects and a region of no shadows appear in the projection surface. On a region mixed with shadow parts and non-shadowed parts, the visibility of the image differs depending on the position; therefore, even when the brightness is adjusted, the image is easy-to-view in some parts and difficult-to-view in the other parts.

For the foregoing reasons, there is a need for a projector device that can project an easier-to-view image.

SUMMARY

According to an aspect, a projector device includes: an image projecting unit for projecting an image; and a control unit for acquiring brightness information of regions included in a projection surface on which the image projecting unit can project the image, and for processing the image that is projected by the image projecting unit and controlling operation of the image projecting unit. The control unit causes the image projecting unit to project, based on the brightness information of the brightness of the regions, the image on a region whose brightness is lower than that of another region.

According to another aspect, the region accounts for a percentage greater than a pre-specified percentage of the projection surface.

According to another aspect, the control unit projects the image on a region that has the least brightness.

According to another aspect, the control unit acquires information about regions that have a brightness lower than a preset reference brightness and projects the image on a region that is the largest among the regions that have a brightness lower than the preset reference brightness.

According to another aspect, the image projecting unit projects the image with reference to a preset reference projection direction, and the control unit projects the image toward a region with the least shift from the reference projection direction among regions that have a brightness less than a predetermined value.

According to another aspect, when the low-brightness region is moved during image projection, the control unit moves a region on which the image is projected in accordance with the movement of the low-brightness region.

According to another aspect, the projector device further includes a notifying unit for notifying, if the low-brightness region lies outside of a range on which the image projecting unit can project the image, an instruction to move the range to include the low-brightness region.

According to another aspect, the control unit changes, in accordance with a shape of the low-brightness region, at least one of direction, size, and shape of the image that is projected by the image projecting unit.

According to another aspect, during image projection performed by the image projecting unit, the control unit interrupts the image projection to acquire the brightness information of the regions included in the projection surface during the interruption.

According to another aspect, the control unit acquires the brightness information of the regions included in the projection surface before a start of image projection by the image projecting unit.

According to another aspect, a projector device includes: an image projecting unit for projecting an image; and a control unit for acquiring information about a region of shadow projected on a projection surface on which the image projecting unit can project the image, and for processing the image that is projected by the image projecting unit and controlling operation of the image projecting unit. The control unit projects the image on the region of shadow based on the information about the region of shadow.

According to another aspect, if the information is acquired indicating that there are two or more regions of shadow, the control unit projects the image on the largest region of shadow.

According to another aspect, when the region of shadow is moved during image projection, the control unit moves a region on which the image is projected in accordance with the movement of the region of shadow.

According to another aspect, the projector device further includes a housing that accommodates each unit therein. The control unit acquires information indicative of a position of a light source that is arranged in a direction opposite to a direction in which the image is projected by the image projecting unit and acquires, based on a relation between the position of the light source and a position of the housing, the information about the region of shadow projected on the projection surface.

According to another aspect, the projector device further includes an image taking unit for acquiring an image of the projection surface. The control unit acquires, based on the image of the projection surface acquired by the image taking unit, the brightness information of regions included in the projection surface.

Advantageous Effects of Invention

A projector device according to the present invention projects an image to a region more appropriate than other regions in a projection surface in accordance with the state of the projection surface, and thus the projector device can project an easier-to-view image.

DESCRIPTION OF EMBODIMENTS

Hereinafter, the invention will be described in detail with reference to the drawings. The following description is not intended to limit the invention. The components in the following description include those that can be easily thought of by persons skilled in the art, and substantially equivalents or those in an equivalent scope. Hereinafter, although a projector device will be described using a mobile electronic device, more particularly, a mobile phone as an example thereof, the application of the invention is not limited to mobile phones. For example, the invention may also be applied to PHSs (Personal Handyphone Systems), PDAs, portable navigation devices, notebook personal computers, gaming devices, or the like. Although a mobile electronic device is preferable from the perspectives of easiness to carry around and better enjoyment of the effects of the present invention, any projector device is available and even stationary projectors or the like are available.

Figure 1:
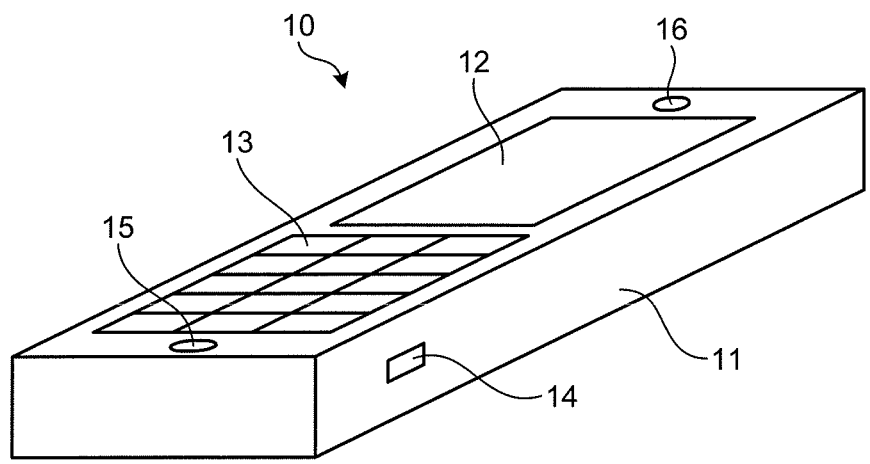
FIG. 1 is a perspective view of the configuration of a mobile electronic device according to an embodiment.
Figure 2:
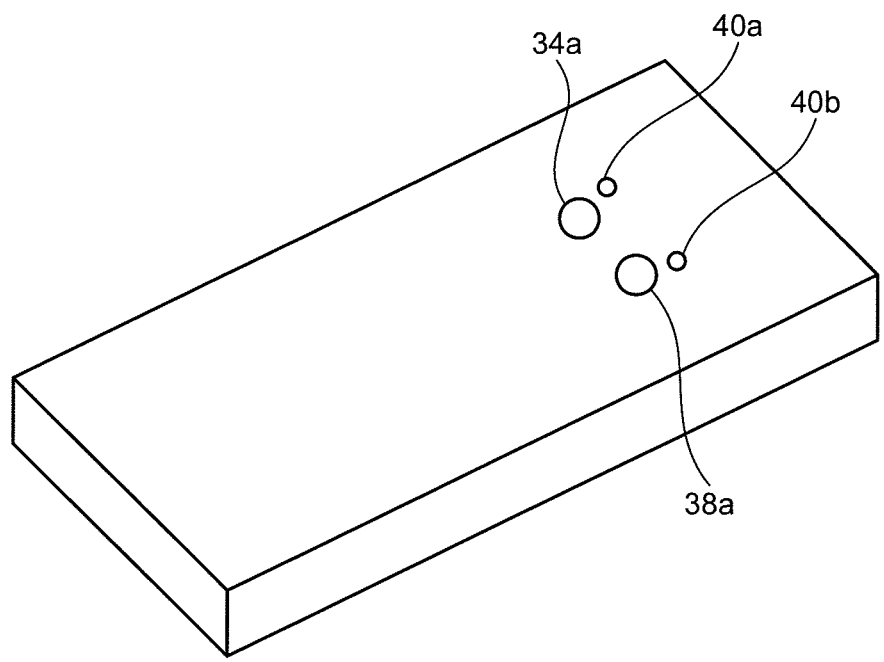
FIG. 2 is a perspective view of the configuration of the mobile electronic device according to the embodiment, viewed from a direction different from the direction of FIG. 1.

Firstly, the outer configuration of a mobile electronic device will be explained. FIG. 1 is a perspective view of the configuration of a mobile electronic device according to an embodiment; FIG. 2 is a perspective view of the configuration of the mobile electronic device according to the embodiment, viewed from a direction different from the direction of FIG. 1. A mobile electronic device 10 is a mobile phone equipped with a wireless communications function. The mobile electronic device 10 is a straight-shaped mobile phone that includes, as illustrated in FIGS. 1 and 2, one box-shaped housing 11 and various components that are accommodated in the housing 11. Although, in the present embodiment, the housing 11 is one box-shaped housing, the housing can be a foldable housing that includes two members that are joined together with a hinge or a slidable housing that includes two members that slide along each other. Alternatively, a housing that includes three or more members joined together is allowable.

The housing 11 includes, as a display unit, a display 12 illustrated in FIG. 1. The display 12 displays a predetermined image as a standby screen when the mobile electronic device 10 is in a standby state for an incoming signal and displays a menu screen for assistance of operations of the mobile electronic device 10.

The housing 11 includes a plurality of operation keys 13 that is used to enter a phone number of an intended party and type words to compose a mail, etc. A dedicated key 14 is provided on a side of the housing 11 (one of surfaces that are substantially perpendicular to the surface on which the operation keys 13 are provided) to control operations of a later-described projector 34. The operation keys 13 and the dedicated key 14 together form an operating unit of the mobile electronic device 10. The housing 11 further includes a microphone 15 that receives sound when the mobile electronic device 10 is in calling mode and a receiver 16 that emits sound when the mobile electronic device 10 is in calling mode.

As illustrated in FIG. 2, a light emitting unit 34a of the projector 34 is provided on a back surface of the housing 11 (a surface that is opposite to the surface on which the display 12 and the operation keys 13 are provided) to project an image. Moreover, an imaging unit 38a of a camera 38 and a transmitting unit 40a and a receiving unit 40b of a distance measuring sensor 40 are provided on the back surface of the housing 11.

Figure 3:
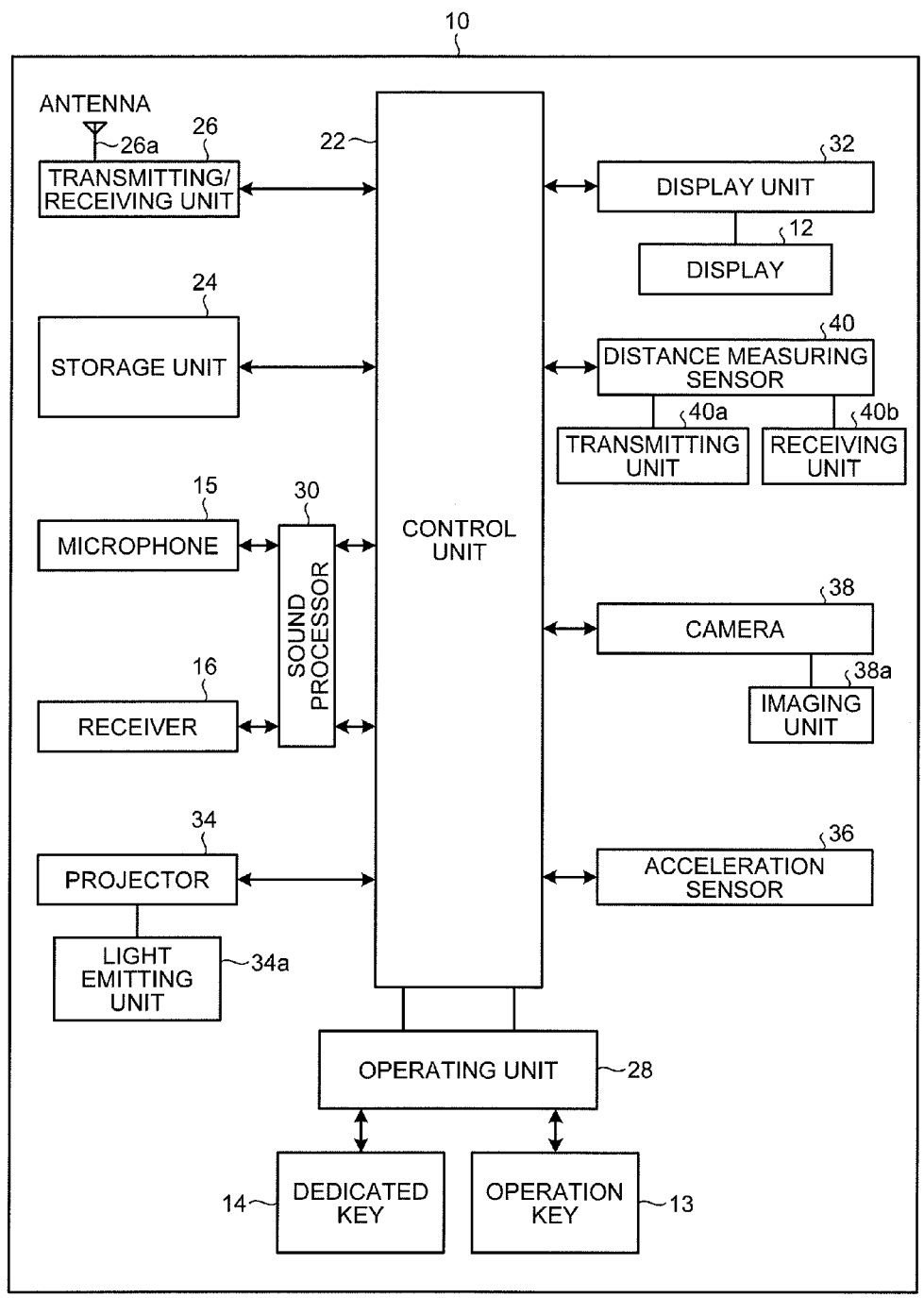
FIG. 3 is a functional block diagram of the mobile electronic device illustrated in FIGS. 1 and 2.

FIG. 3 is a functional block diagram of the mobile electronic device illustrated in FIGS. 1 and 2. As illustrated in FIG. 3, the mobile electronic device 10 includes a control unit 22, a storage unit 24, a transmitting/receiving unit 26, an operating unit 28, a sound processor 30, a display unit 32, the projector 34, an acceleration sensor 36, the camera 38, and the distance measuring sensor 40.

The control unit 22 is a processing unit, such as a CPU (Central Processing Unit), that integrally controls general operations of the mobile electronic device 10. In other words, the control unit 22 controls the operations of the transmitting/receiving unit 26, the sound processor 30, the display unit 32, etc., so that various processes of the mobile electronic device 10 are performed in an appropriate procedure in accordance with an operation of the operating unit 28 and software stored in the storage unit 24 of the mobile electronic device 10. Various processes of the mobile electronic device 10 include, for example, a voice call performed via a line switching network, composing and transmitting/receiving an e-mail, and browsing a Web (World Wide Web) site on the Internet. Operations of the transmitting/receiving unit 26, the sound processor 30, the display unit 32, etc., include, for example, transmitting/receiving a signal by the transmitting/receiving unit 26, inputting/outputting a sound by the sound processor 30, and displaying an image by the display unit 32.

The control unit 22 performs processes based on program(s) stored in the storage unit 24 (for example, an operating system program, an application program, etc.). The control unit 22 includes, for example, a micro processor units (MPU: Micro Processor Unit) that performs the abovementioned various processes of the mobile electronic device 10 according to a procedure specified by the software. In other words, the control unit 22 sequentially reads command codes from a program, such as an operating system program and an application program, stored in the storage unit 24 and then performs processes.

The control unit 22 has a function of performing two or more application programs. Application programs performed by the control unit 22 include, for example, an application program that controls the driving of the projector 34, a game application program that activates various games, etc.

The storage unit 24 stores therein software and data that are used for processes performed by the control unit 22 and also stores therein a task that activates the abovementioned application program that controls the driving of the projector and a task that activates various game application programs.

The storage unit 24 stores therein not only these tasks but also, for example, sound data acquired through communications or download, software that is used when the control unit 22 controls the storage unit 24, an address book that stores and manages phone numbers, mail addresses, etc., of intended parties, a sound file of dialing tones, ringing tones, etc., temporary data that is used for software processing, etc. The storage unit 24 also stores therein image data that includes size information of a subject (target to be projected). Computer programs and temporal data that are used for software processing are temporarily stored in a work area that is allocated to the storage unit 24 by the control unit 22. The storage unit 24 includes, for example, a nonvolatile storage device (nonvolatile semiconductor memory, such as ROM: Read Only Memory, a hard disk device, etc.), a read/write storage device (for example, SRAM: Static Random Access Memory, DRAM: Dynamic Random Access Memory), etc.

The transmitting/receiving unit 26 includes an antenna 26a. The transmitting/receiving unit 26 establishes a wireless signal path between the mobile electronic device 10 and a base station based on a CDMA system or the like via a channel that is assigned by the base station, thereby making telephone communications and information communications with the base station.

The operating unit 28 includes the dedicated key 14 and the operation keys 13 that are assigned with various functions and operate as, for example, a power supply key, a call key, numeric keys, character keys, direction keys, an enter key, an outgoing key, etc. When these keys are entered by an operation of a user, a signal that corresponds to the detail of the operation is generated. The generated signal is then input to the control unit 22 as an instruction from the user.

The sound processor 30 processes a sound signal that is input to the microphone 15 and a sound signal that is output from the receiver 16. In other words, the sound processor 30 amplifies a sound input from the microphone 15, then performs AD conversion (Analog Digital conversion), then performs signal processing, such as encoding, then converting the sound to digital sound data, and then outputs the digital sound data to the control unit 22. Upon receiving sound data from the control unit 22, the sound processor 30 decodes the sound data, then performs DA conversion (Digital Analog conversion), then performs processing, such amplifying, then converts the data to an analog sound signal, and then outputs the analog sound signal to the receiver 16.

The display unit 32 includes a display panel (the abovementioned display 12 or the like) that is a liquid crystal display (LCD, Liquid Crystal Display), an organic EL (Organic Electro-Luminescence) panel, or the like. The display unit 32 displays, on the display panel, a video in accordance with video data received from the control unit 22 and an image in accordance with image data received from the control unit 22.

Figure 4:
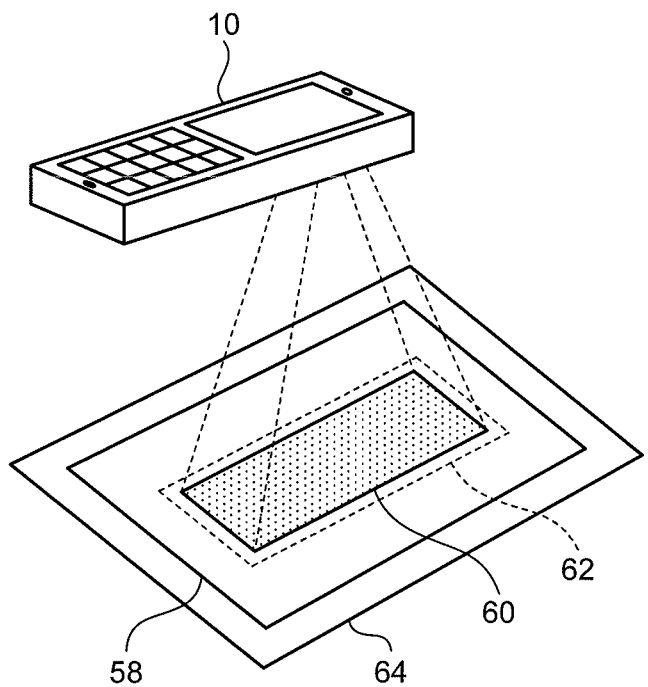
FIG. 4 is an explanatory diagram illustrating a situation where the mobile electronic device illustrated in FIGS. 1 and 2 displays an image.

The projector 34 is an image projecting system for projecting an image. The projector 34 includes, as described above, the light emitting unit 34a on the back surface of the housing 11 to project an image. FIG. 4 is an explanatory diagram illustrating a situation where the mobile electronic device illustrated in FIGS. 1 and 2 displays an image. The mobile electronic device 10 projects an image from the light emitting unit 34a of the projector 34. More particularly, by emitting light of an image, as illustrated in FIG. 4, the projector 34 projects the image on a certain region (hereinafter, "projection surface") 58 included in a surface that faces the back surface of the housing 11, such as a floor, a wall surface, and a screen. In the example illustrated in FIG. 4, an image 60 is projected only on a region (as described later, shadow) 62 that is a part of the region on which the projector 34 can project an image, i.e., the projection surface 58. The region 62 is a region on which a shadow of the housing 11 is projected and the brightness thereof is lower than the brightness of the other region of the projection surface 58. This will be explained later. Moreover, the operation of the projector 34 is controlled by the control unit 22. The projector 34 projects various pictures received from the control unit 22, for example, movies and presentation materials, and then displays them on the projection region. It is noted that the projection surface 58 is a surface that reflects light projected from the projector 34 and on which the image is projected, i.e., a surface that makes an image visible; therefore, a member that allows light to pass through, such as transparent glass, cannot operate as a projection surface. The projection surface 58 is not limited to a flat surface and can be a bumpy surface.

The projector 34 includes a light source and an optical system that switches, in accordance with image data, whether or not light emitted from the light source is to be projected. For example, the projector 34 can be a projector that includes, as the light source, a halogen light, an LED light source, or an LD light source and, as the optical system, an LCD (Liquid Crystal Display) or a DMD (Digital Micro-mirror Device). With this configuration, the light emitted from the light source is projected as an image on the entire surface of the projection surface 58 by arranging the optical system to cover the entire projection surface 58 in associated with each pixel and switching the optical system between on and off in accordance with an image. Alternatively, the projector 34 can be a projector that includes, as the light source, a laser light and, as the optical system, a switching element that switches whether to allow light emitted from the light source to pass through and a mirror that reflects light, after passed through the switching element, for raster scanning. With this configuration, an image is projected on the projection region by changing the angle of light emitted from the laser light using the mirror so that the entire surface of the projection region is scanned with the illumination light.

The acceleration sensor 36 is a detector that detects an acceleration exerted on the housing 11. Detectors that detect the acceleration in various manners can be used as the acceleration sensor 36. For example, a detector can be used that detects the acceleration in accordance with a change in the capacitance, a change in the piezoresistance, a change in the relative position, etc. When an operator moves or waves the housing 11, the acceleration sensor 36 detects an acceleration exerted on the housing 11.

The camera 38 is an imaging system that acquires, using the imaging unit 38*a* that is provided on the back surface of the housing 11, an image of a region including the projection surface (a shooting region 64 of FIG. 4). In other words, the camera 38 acquires an image in a direction in which the projector 34 emits light. It is noted that the camera 38 is, for example, an imaging system that takes an image at an angle of view that is wider than the angle of view of the image illuminated by the projector 34, i.e., the camera 38 is preferably capable of taking an image of the shooting region 64 that is wider than the projection surface 58, on which an image is projected by the projector 34.

The distance measuring sensor 40 is a measuring device that measures the distance from a surface which an image emitted from the projector 34 reaches and on which the image is displayed, i.e., the projection surface 58. The distance measuring sensor 40 includes the transmitting unit 40*a*, which is arranged on the back surface of the housing 11 and emits a measuring wave, such as an infrared ray, an ultrasonic wave, and a laser light, and the receiving unit 40*b*, which is arranged on the back surface of the housing 11 and receives the measuring wave. The measuring wave emitted from the transmitting unit 40*a* hits a target object and is reflected: the receiving unit 40*b* receives the reflected measuring wave. The distance measuring sensor 40 calculates the distance between the distance measuring sensor 40 and the projection surface 58 based on the intensity of the measuring wave received by the receiving unit 40*b*, the angle of incidence of the measuring wave, and/or the time between when the transmitting unit 40*a* sends the measuring wave and when the receiving unit 40*b* receives the measuring wave. The mobile electronic device 10 is basically configured as described above.

Figure 5:
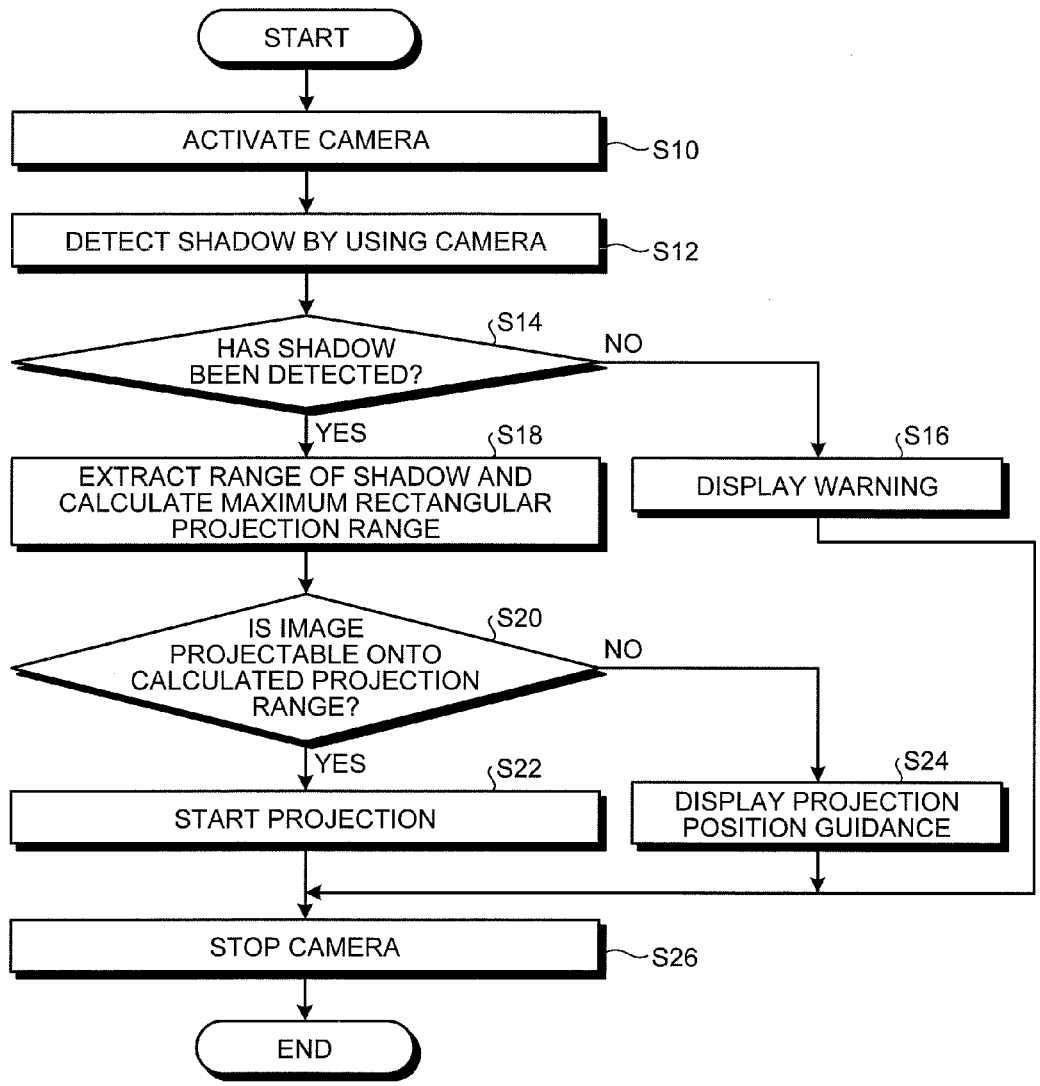
FIG. 5 is a flowchart of an example of the operation of the mobile electronic device.

The operation of the mobile electronic device 10, more particularly, the control operation of the projector 34 will be explained below with reference to FIG. 5. FIG. 5 is a flowchart of an example of the operation of the mobile electronic device. The process illustrated in FIG. 5 is a process in which the projector 34 projects an image on a shadowed region that is included in the projection surface.

Firstly, when an activation instruction is entered by an operation of the operator to activate the projector 34, the control unit 22 activates the camera 38 at Step S10 and then performs shadow detection by using the camera 38 at Step S12. More particularly, the control unit 22 activates the camera 38 at Step S10 and starts acquisition of an image of the shooting region 64 by the imaging unit 38*a* of the camera 38 and then acquires detection information about a shadowed region included in the shooting region 64 from the image acquired at Step S12. It is allowable to cause an internal computing system of the projector 34 that includes the control unit 22 to perform detection of a shadow at Step S12. Alternatively, the control unit 22 can be configured to send acquired image information to an external computing system (for example, an external server, etc.) via the transmitting/receiving unit or the like and then acquire detection information that is generated based on an analysis result made by the external computing system.

Then, based on a shadow detection result made at Step S12, the control unit 22 acquires at Step S14 a determination result indicating whether a shadow is detected. When the control unit 22 acquires at Step S14 a determination result indicating that no shadow is detected in the shooting region 64 (No), the control unit 22 displays a warning at Step S16. More particularly, the control unit 22 displays a message on the display unit 32 that there is no shadowed region in the shooting region 64 and therefore there is no region of shadow on which an image is projected, and the process control goes to Step S26. It is allowable to configure the control unit 22 to cause an internal computing system of the projector 34 to make a determination at Step S14. Alternatively, in the same manner as the detection at Step S12, it is allowable to cause the control unit 22 to acquire a determination result made by an external computing system via the transmitting/receiving unit or the like.

When the control unit 22 acquires at Step S14 a determination result indicating that a shadow is detected (Yes), the control unit 22 extracts the range of the shadow and calculates a maximum rectangular projection range at Step S18. In other words, the control unit 22 calculates a region that is included in the region of shadow detected at Step S12 so that the outer edge thereof is a rectangle (oblong, square) and the area thereof increases to the largest possibly.

When the projection range is calculated at Step S18, the control unit 22 determines at Step S20 whether the calculated projection range is within a projectable range. In other words, the control unit 22 determines whether the projection range calculated at Step S18 is included in the projection surface. When it is determined at Step S20 that it is within a projectable range (Yes), i.e., the projection range calculated at Step S18 is included in the projection surface, the control unit 22 starts projection at Step S22. More particularly, the control unit 22 projects an image on the projection range calculated at Step S18. When the control unit 22 starts projection at Step S22, the process control goes to Step S26.

When it is determined at Step S20 that it is not within a projectable range (No), i.e., the projection range is not included in the projection surface, the control unit 22 displays an projection position guidance at Step S24. More particularly, the control unit 22 causes the display unit 32 to display movement information that relates to the position of the housing 11 such that the projection range is moved inside the projection surface. Movement information includes an instruction to move the housing 11 up and down and right and left, an instruction to change the angle of the housing 11, etc. After that, the control unit 22 goes to Step S26.

When the process at Step S16, Step S22 or Step S24 is completed, the control unit 22 stops the camera to end taking an image of the projection surface at Step S26, and then completes the process. The control unit 22 performs the above processes at a start of projecting an image by the projector 34. If a warning is displayed at Step S16 or if guidance is displayed at Step S24 to guide the projection position, the projector 34 does not project an image; therefore, the mobile electronic device 10 may be configured to perform the process of Step S10 and the subsequent processes again a predetermined time after or in response to an operation of the operator.

The processes performed during image projection will be explained below with reference to FIG. 6. When the projector 34 is projecting an image, the control unit 22 performs the processes of the flowchart illustrated in FIG. 6. Firstly, the control unit 22 determines whether projection is to be stopped at Step S30. In other words, it is determined whether an instruction to stop the projector 34 from projecting an image is received by an operation of the operator or by a predetermined setting.

When it is determined at Step S30 that projection is not to be stopped (No), i.e., a process to stop shooting is not input and the projector 34 should keep projecting an image, the control unit 22 detects a displacement amount by using the acceleration sensor 36 at Step S32. The control unit 22 can acquire a calculation result of the displacement amount based on information indicative of a change in the acceleration detected by the acceleration sensor. The displacement amount is an amount that is accumulated since start of the latest projection start process, i.e., since the point of time when the range in which an image is projected is calculated. A calculation result of the displacement amount can be acquired, in the same manner as in a detection result and a determination result, by an internal computing system of the projector 34 including the control unit 22. Alternatively, it is allowable to cause the control unit 22 to send various information to an external computing system (external server, etc.) via the transmitting/receiving unit or the like and cause the external computing system to perform calculation, thereby acquiring a calculation result.

When a calculation result of the displacement amount is acquired at Step S32, the control unit 22 determines whether a movement has occurred that is greater than a specified value at Step S34. In other words, the control unit 22 determines whether the displacement amount is greater than a preset specified value. When the control unit 22 determines at Step S34 that a movement has not occurred that is greater than the specified value (No), i.e., the displacement amount is not greater than the specified value, the process control goes to Step S30 and the control unit 22 determines whether projection is to be stopped, again and repeats the above processes.

When it is determined at Step S34 that a movement has occurred that is greater than the specified value (Yes), the control unit 22 stops projection at Step S36 and, after projection of an image by the projector 34 stops, the projection start process is performed at Step S38. The projection start process is the process of the flowchart illustrated in FIG. 5. At Step S38, the control unit 22 activates the camera, then detects a region of shadow, then calculates the projection range, then determines whether an image is projectable, and then, if projectable, starts projection of the image on the calculated region, or, if not projectable, ends the process without starting projection.

When the projection start process is performed at Step S38, the control unit 22 determines at Step S40 whether it is in a projection mode, i.e., the projector 34 is projecting an image. When the control unit 22 determines that it is in the projection mode (Yes) at Step S40, the process control goes to Step S30, whether projection is to be stopped is determined again and the above process is repeated. When the control unit 22 determines that it is not in the projection mode (No) at Step S40, i.e., the projector 34 is not projecting an image, the process goes to end.

When it is determined at Step S30 that projection is to be stopped (Yes), i.e., an instruction is received to stop projecting, the control unit 22 stops projection at Step S42. In other words, the control unit 22 stops projection of an image by the projector 34 at Step S42 and, after that, the process goes to end.

Figure 6:
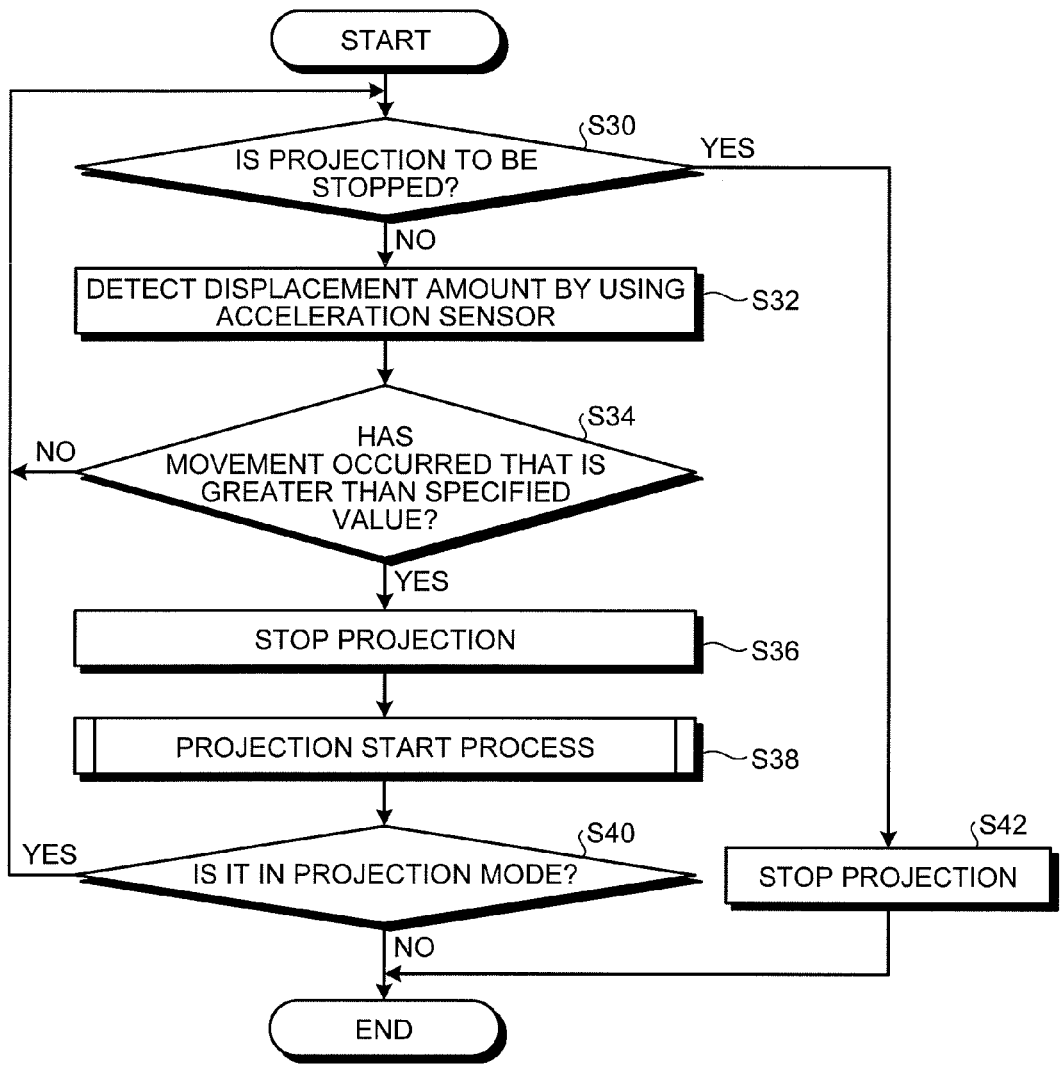
FIG. 6 is a flowchart of an example of the operation of the mobile electronic device.

By performing the processes of the flowcharts illustrated in FIGS. 5 and 6, the mobile electronic device 10 projects an image on a shadowed region included in the projection surface. Because, as described above, an image is projected on a part that is determined as a shadow, an image is projected on a darker part of the projection surface and the projected image is easy to view. If an illumination (light source) is positioned vertically upward and an image is projected on a floor, a table, or the like, etc., because a shadow of the housing 11 is basically projected on the projection surface, it is possible to project an image on the shadow of the housing 11.

Moreover, because a shadowed part is automatically extracted from an image taken by the camera 38, it is possible to project an image automatically on the shadow part without manual adjustment of the position at which the image output from the projector 34 is projected by moving the housing 11 by the operator. With this configuration, the operation load on the operator is reduced.

Figure 7:
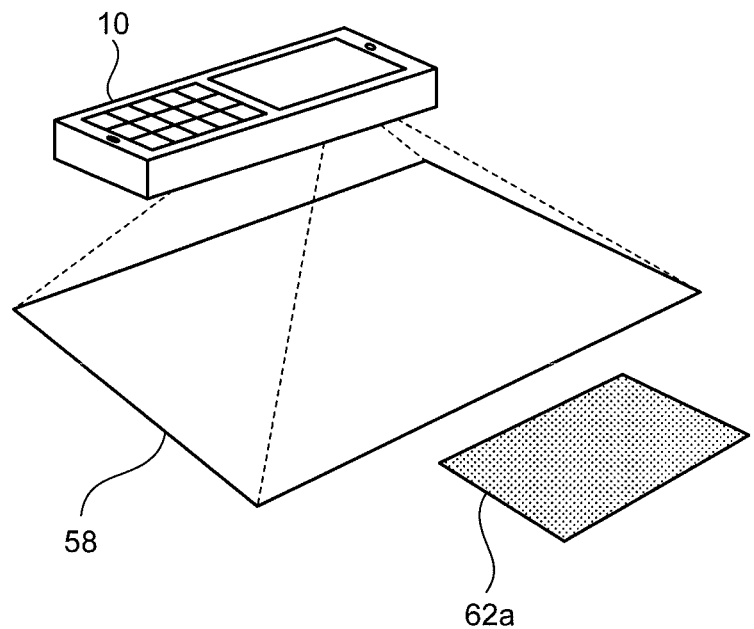
FIG. 7 is an explanatory diagram illustrating a situation where the mobile electronic device illustrated in FIGS. 1 and 2 projects an image.

FIG. 7 is an explanatory diagram illustrating a situation where the mobile electronic device illustrated in FIGS. 1 and 2 projects an image. As it is explained at Step S24 of the flowchart illustrated in FIG. 5, even when the region of a shadow 62a is out of the region of the projection surface 58 as illustrated in FIG. 7, by a guidance for the projection position, it is possible to move the mobile electronic device 10 so that the region of the shadow 62a overlaps with the projection surface 58; therefore, it is possible to project an image on an easier-to-view region.

Figure 8:
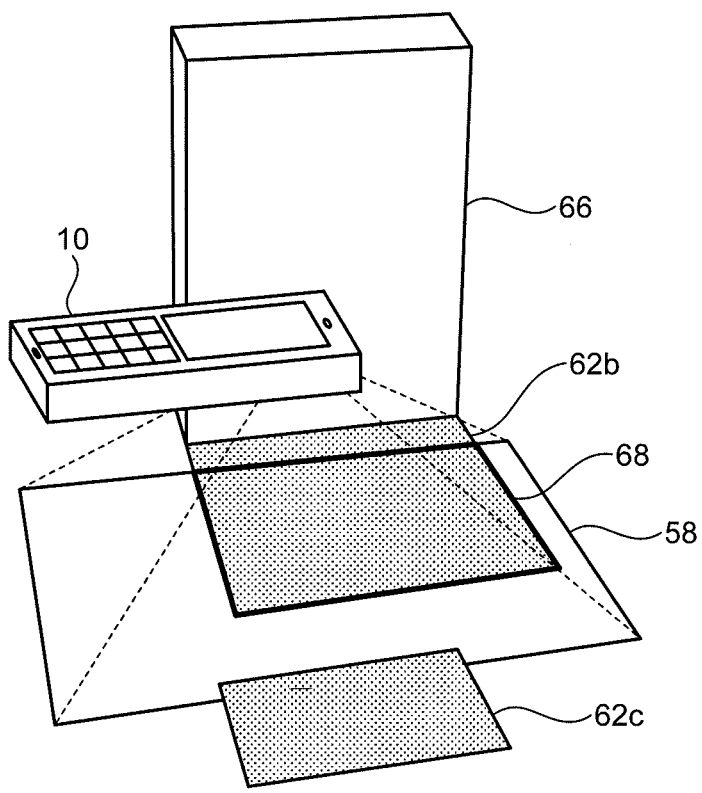
FIG. 8 is an explanatory diagram illustrating a situation where the mobile electronic device illustrated in FIGS. 1 and 2 projects an image.

FIG. 8 is an explanatory diagram illustrating a situation where the mobile electronic device illustrated in FIGS. 1 and 2 projects an image. As it is explained at Step S18 of the flowchart illustrated in FIG. 5, a region is extracted from detected shadows so that a largest rectangular range is trimmed and an image is projected on the region; therefore, it is possible to project the image in a more enlarged manner. More particularly, as illustrated in FIG. 8, if there are two shadows, i.e., a shadow 62b of an object 66 and a shadow 62c of a terminal in the projection surface 58 (and/or the shooting region) and the region of the shadow 62b in the projection surface 58 is larger than the region of the shadow 62c in the projection surface 58, an image is projected on a region 68 where the shadow 62b overlaps with the projection surface 58. As described above, because an image is projected on a larger region of shadow, it is possible to project the image in a more enlarged manner.

Moreover, because a region is detected from regions that are detected as shadows so that a large rectangular region is trimmed, it is possible to project a rectangular image in a more enlarged manner. Although, in the present embodiment, a region of shadow is detected so that a maximum rectangular region is trimmed, the present invention is not limited thereto. The shape of a detected region is decided in accordance with the outer shape of an image that is projected by the projector 34. By calculating, from regions that are determined as shadows, a region so that a maximum region similar to the outer shape of an image to be projected is trimmed, it is possible to display the image in a more enlarged manner. The control is not limited to detecting a region of shadow shaped in accordance with an image. It is allowable to modify the shape of an image in accordance with the shape of a shadow.

The displacement amount is detected by using the acceleration sensor 36, and if the displacement amount increases to a value greater than a given value, the projection start process is performed again; therefore, even if the housing 11 is moved, the projection position is automatically changed and the projector can keep projecting an image on the shadowed region.

Although, in the example illustrated in FIGS. 5 and 6, re-setting is performed when the displacement amount increases to a value greater than a given value, the configuration is not limited thereto. It is allowable to perform re-setting a given time after or when the posture of the housing 11 is changed. As described above, by re-setting the projection position using various conditions, it is possible to adjust the position on which an image is projected in accordance with a change in the position of a shadow and a change in the projection position.

The method of detecting a region of shadow in an image taken by the camera 38 is not limited specially and various methods are allowable. For example, a method is allowable that involves analyzing an image that is taken by a camera and extracting a shadow part based on a change in the color. Another method is allowable that involves acquiring both an image irradiated with light emitted from a light emitting unit, such as a light of a camera, and an image irradiated when no light, then calculating the original color and the original shape of the projection surface from the difference between the two images, then removing information about the color and the shape of the projection surface, and then detecting a shadow part.

The mobile electronic device 10 preferably measures the distance to the projection surface by using the distance measuring sensor 40 and adjusts an image to be projected based on the measurement result. Because an image is adjusted based on the distance to the projection surface, it is possible to project a more appropriate image on the projection surface.

Although, in the above embodiment, an image is projected on a region of shadow in the projection surface, it is not necessary to always project an image on a region of shadow. Modes are preferably selectable by an operation of the operator. In other words, it is preferable that when the operator selects a mode (for example, shadow projection mode), a region of shadow is detected in the projection surface and an image is projected on the region, while when the mode is not selected, an image is projected on the projection surface. Because modes are switched as described above, it is possible to switch the conditions of a projected image in accordance with the usage of the operator. In other words, when the operator wishes to project a clear image at the expense of a slight reduction in the projection size, he/she selects the shadow projection mode. Otherwise, he/she can select the normal mode.

Although, in the above embodiment, a region of shadow is detected, the present invention is not limited thereto. It is allowable to detect a region that has a brightness lower than a given value (lower than specified value). When, as described above, a region that has a brightness less than a given value is detected, it is possible to project an image on a region that is dark due to various reasons including an effect of shadow and that is appropriate for projection. Therefore, an image is projected on an easier-to-view region.

Although, as described in the above embodiment, it is preferable to detect a region that has a brightness lower than a given value (lower than a specified value, lower than a reference brightness), it is allowable to detect, in the projection surface, a relatively low brightness region, i.e., a relatively dark region and then project an image on the region. Because, in this case, an image is projected on a relatively dark part, although the brightness can be greater than the given value, it is easier to view the image than when the image is projected on another region.

The mobile electronic device 10 can be configured to project an image on a lowest brightness region. When, as described above, an image is projected on a lowest brightness region, the projected image is easier to view.

The mobile electronic device 10 can be configured to set a reference projection direction among directions in which the projector 34 can project an image and project an image on a region with the least shift from the reference projection direction, i.e., a region closest to the reference projection direction among regions that have a brightness less than a given value. The reference projection direction is a predetermined position on the projection surface, for example, the center of the projection surface, or the like. Because an image is projected on a region closer to the reference position, the correcting process that is performed for projecting an image by the projector 34 is reduced.

Any region included in the projection surface may be controlled with reference to regions that are pre-defined by separating the projection surface (for example, to 9, 16, 25, or 64 sections). In this case, it is allowable to project an image on one region. It is also allowable to project an image on adjacent regions that satisfy a predetermined condition with reference to one region. When two or more regions are compared, the comparing can be performed using the average of each region or using the maximum or the minimum of each region.

It is allowable that, if the area of a region that is determined as a shadow or a region that has a brightness lower than a given value is smaller than a given area, the control unit 22 determine that the region is not a projectable area and does not perform image projection. With this configuration, it is possible to prevent projecting an image at a size smaller than a certain size.

The control unit 22 preferably determines a region on which an image is projected by taking not only the brightness and the shadow but also the original color of the projection surface into consideration. More particularly, it is preferable to project an image on a region in a color close to white. When an image is projected on a low brightness or shadowed region in a color close to white, the projected image becomes easier to view.

Figure 9:
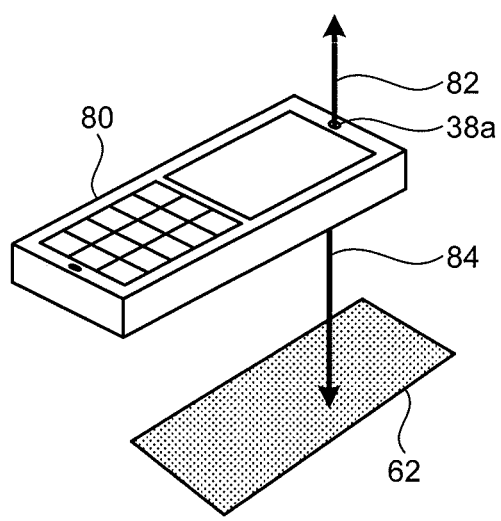
FIG. 9 is a perspective view of the configuration of a mobile electronic device according to another embodiment.

Although the mobile electronic device 10 acquires an image of the projection surface and determines the position of a shadow from the image, the present invention is not limited thereto. Another example of the mobile electronic device will be explained below with reference to FIG. 9. FIG. 9 is a perspective view of the configuration of a mobile electronic device according to another embodiment. A mobile electronic device 80 illustrated in FIG. 9 has almost the same configuration as the configuration of the mobile electronic device 10 illustrated in FIGS. 1 and 2 except for the arrangement position of the imaging unit 38*a* of the camera 38. The same configuration as that of the mobile electronic device 10 is not explained below and the matters particular to the mobile electronic device 80 will be explained in detail below.

The imaging unit 38*a* of the camera 38 of the mobile electronic device 80 is provided on a surface of the housing 11 on which the display 12 and the operation keys 13 are provided, i.e., a surface opposite to a surface on which the light emitting unit 34*a* of the projector 34 is provided. The camera 38 shoots a region that faces the surface of the housing 11 on which the display 12 and the operation keys 13 are provided, i.e., the opposite side of the surface from which an image is projected by the projector 34 (in a direction indicated by an arrow 82) and acquires an image thereof.

The mobile electronic device 80 has the above configuration and the control unit 22 detects a light source by using an image taken by the camera 38, then detects, based on the relation between the position of the detected light source and the housing 11, a region on which a shadow of the housing 11 is projected in the projection surface, and then projects an image on the region on which the shadow 62 of the housing 11 is projected. Moreover, the control unit 22 calculates, from a detection result of the distance measuring sensor 40, the distance to the projection surface (the surface of a table illustrated in FIG. 9) in a direction indicated by an arrow 84, then determines the size of the shadow based on the distance, and then calculates the size of an image to be projected.

Figure 10:
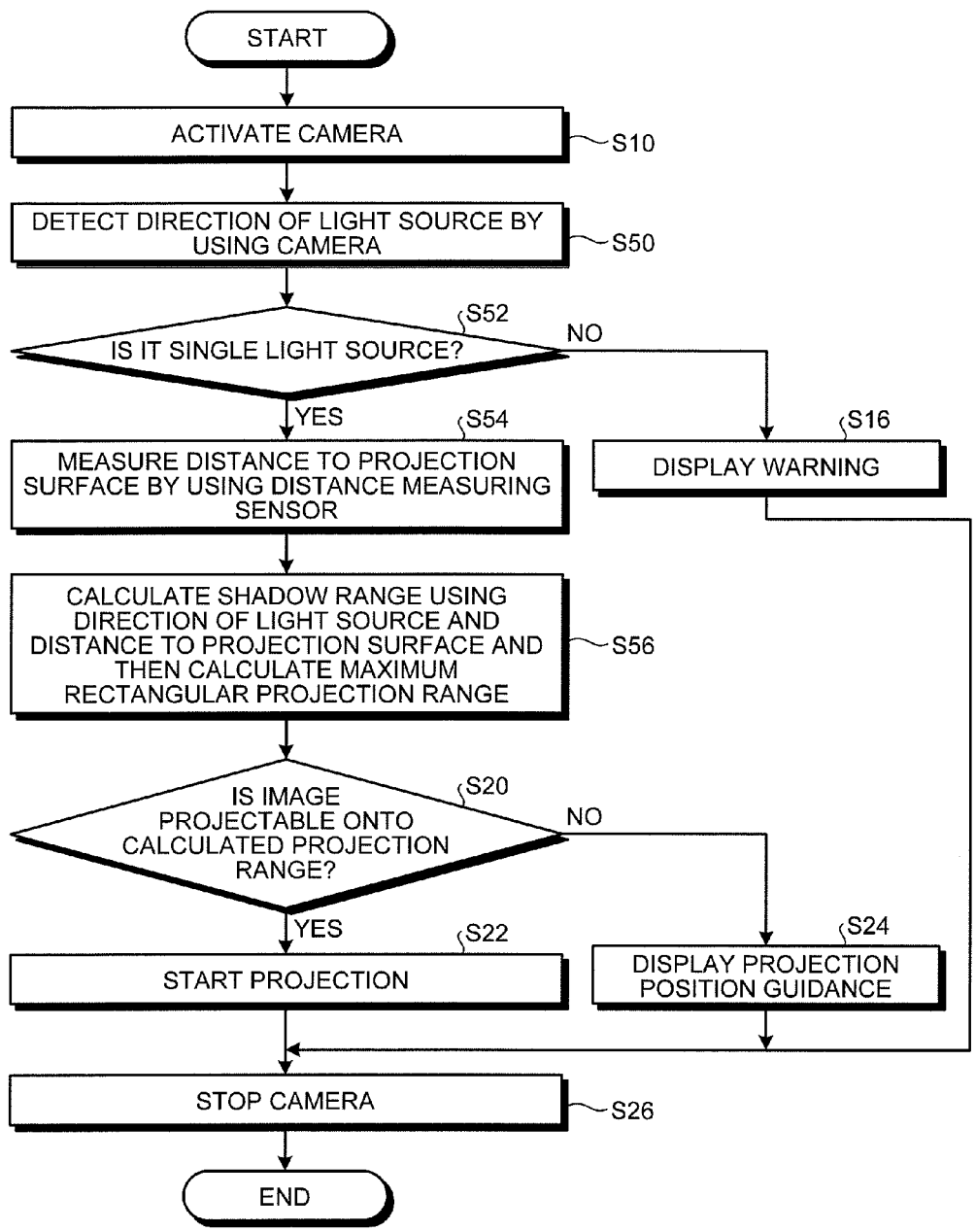
FIG. 10 is a flowchart of an example of the operation of the mobile electronic device illustrated in FIG. 9.

The control performed by the control unit 22 will be explained below with reference to FIG. 10. FIG. 10 is a flowchart of an example of the operation of the mobile electronic device illustrated in FIG. 9. Some steps of the flowchart illustrated in FIG. 10 are the same as those of the flowchart illustrated in FIG. 5. Therefore, the same steps are denoted with the same step numbers and the details are not explained.

Firstly, when an activation instruction is entered by an operation of the operator to activate the projector 34, the control unit 22 activates the camera 38 at Step S10. Then, the control unit 22 detects the direction of a light source by using the camera 38 at Step S50. More particularly, the control unit 22 starts, at Step S50, acquiring an image of a surface that faces the display 12 etc., of the housing 11 by using the imaging unit 38a of the camera 38, analyzes the acquired image, and detects a light source, such as a fluorescent light, an LED, or an incandescent lamp, and the position of the light source in the image. After that, the control unit 22 detects the direction of the detected light source with respect to the housing 11. In other words, a direction is detected in which light emitted from the light source projects a shadow of the housing 11.

When the direction of the light source is detected at Step S50, the control unit 22 determines at Step S52 whether the light source that is detected at Step S50 is a single light source. When it is determined at Step S52 that it is not a single light source (No), i.e., two or more light source are detected or no light source is detected, the control unit 22 displays a warning at Step S16. More particularly, the control unit 22 causes the display unit 32 to display a message that, because no light source is detected or two or more light sources are detected, it is impossible to identify the position of the shadow, and the process control goes to Step S26.

When it is determined at Step S52 that it is a single light source (Yes), the control unit 22 measures the distance to the projection surface by using the distance measuring sensor 40 at Step S54. In other words, the distance between the housing 11 and the projection surface is measured. Thereafter, the control unit 22 calculates a shadow range by using the direction of the light source and the distance to the projection surface and then calculates a maximum rectangular projection range at Step S56. In other words, based on the direction of the light source detected at Step S50 and the distance to the projection surface measured at Step S54, the range of a shadow of the housing 11 that is projected on the projection surface is calculated, more particularly, the size and the shape of the shadow is calculated, and then, from the calculated shadow range, a maximum region defined by a rectangular (oblong, square) outer edge is calculated.

When the projection range is calculated at Step S56, the control unit 22 determines at Step S20 whether the calculated projection range is within a projectable range. When it is determined at Step S20 that the projection range is within a projectable range (Yes), the control unit 22 starts projection at Step S22. When the control unit 22 starts projection at Step S22, the process control goes to Step S26.

When it is determined at Step S20 that the projection range is not within a projectable range (No), the control unit 22 displays a projection position guidance at Step S24. Thereafter, the control unit 22 goes to Step S26.

When the process of Step S16, Step S22 or Step S24 is completed, the control unit 22 stops the camera at Step S26 to end taking an image of the projection surface, and then completes the process. The control unit 22 performs the above processes at a start of projecting an image by the projector 34. If a warning is displayed at Step S16 or if guidance is displayed at Step S24 to guide the projection position, the projector 34 does not project an image; therefore, the mobile electronic device 80 may be configured to perform the process of Step S10 and the subsequent processes again a predetermined time after or in response to an operation of the operator. When the projector 34 is projecting an image, the control unit 22 of the mobile electronic device 80 performs the same process as that of the flowchart illustrated in FIG. 6.

Because the position of a light source is identified, the mobile electronic device 80 can detect the position of a shadow of the housing projected on the projection surface. Moreover, because an image is projected on the position of the shadow, an easy-to-view image is projected on the projection surface.

Although, in the above embodiment, a warning is displayed when the light source is not a single light source, the present invention is not limited thereto. It is allowable, even if two or more light sources are detected, to calculate shadows that are projected on the projection surface by lights emitted from the light sources respectively and then calculate a region on which an image is to be projected using the calculated shadows based on the conditions. For example, it is allowable to calculate a region of the largest shadow among shadows of the housing that are projected on the projection surface by the respective light sources or a region that is the darkest (region of the darkest shadow) because of the intensity of light and overlapped shadows and then project an image on the region.

It is allowable to detect, using a lens focusing function and/or an image analysis, the distance between a light source and the housing and calculate and adjust the size of the shadow and the size of an image to be projected based on the distance between the light source and the housing and the distance between the housing and the projection surface. By taking the distance between a light source and the housing into consideration as described above, it is possible to project an image at a more appropriate size on a shadow on the projection surface. A distance measuring sensor may be provided to measure the distance between a light source and the housing.

Although, in the above embodiment, the distance between the housing and the projection surface is detected by using a distance measuring sensor so that an image is projected at a more appropriate size, the present invention is not limited thereto. It is allowable to assume that the relation between the size of a shadow and the size of an image to be projected is fixed regardless of the distance between the housing and the projection surface and calculate the size of the image that is projected on the projection surface.

Although, in any of the above embodiments, an image is taken, then a shadowed region or a low brightness region included in the projection surface is determined and then the region is extracted, the present invention is not limited thereto. The configuration of a determining unit is not limited thereto as long as it can determine a shadowed region or a low brightness region included in the projection surface. For example, if there is a unit capable of directly measuring the brightness of each part of the projection surface, the unit can be used.

Figure 11:
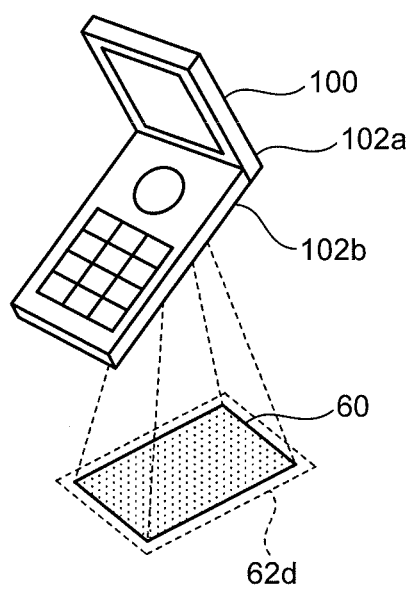
FIG. 11 is a perspective view of the configuration of a mobile electronic device according to another embodiment.

As described above, the shape of the housing of the mobile electronic device is not limited to a straight shape. FIG. 11 is a perspective view of the configuration of a mobile electronic device according to another embodiment. A mobile electronic device 100 illustrated in FIG. 11 includes a housing that includes a first housing 102a and a second housing 102b. The first housing 102a and the second housing 102b are joined together with a hinge. The mobile electronic device 100 has so-called "foldable housing", in which the first housing 102a and the second housing 102b turn opened and closed via the hinge. The components of the mobile electronic device 100 that corresponds to the components provided on the back surface of the mobile electronic device 10, such as the projector and the camera, are arranged on the back surface of the second housing 102b (surface opposite to a surface on which the operation keys, etc., are arranged). As described above, in the same manner as in the mobile electronic device 10, the foldable mobile electronic device 100 can project an easier-to-view image by detecting a shadow 62d and projecting the image 60 on the position thereof. The shadow 62d illustrated in FIG. 11 is a shadow of the second housing 102b projected on the projection surface. The mobile electronic device 100 can set the projection position with reference to not the shadow but the brightness.

Industrial Applicability

As described above, a projector device according to the present invention is suitably used as a projector device that possibly projects an image under various projection conditions.

The invention claimed is:

1. A projector device, comprising:
an image projecting unit for projecting an image; and
a control unit for
acquiring brightness information of regions included in a projection surface on which the image is projectable by the image projecting unit, and
determining a projection region on which the image is to be projected by the image projecting unit based on the brightness information of the regions,
wherein the projection region is a low-brightness region, among the regions, whose brightness is lower than that of another region.

2. The projector device according to claim 1, wherein
the control unit is configured to cause the image projecting unit not to project the image when the low-brightness region is smaller than a given area.

3. The projector device according to claim 1,
wherein the control unit is configured to acquire determines a region whose brightness is lowest among those of the regions, as the low-brightness region.

4. The projector device according to claim 1, wherein
the control unit is configured to acquire a region whose area is largest among those of the regions whose brightness is lower than a reference brightness, as the low-brightness region.

5. The projector device according to claim 1, wherein
the image projecting unit is configured to project the image with reference to a preset reference projection direction, and
the control unit is configured to acquire a region with the least shift from the reference projection direction among the regions whose brightness is lower than a reference brightness, as the low-brightness region.

6. The projector device according to claim 1, wherein, when the low-brightness region is moved during image projection,
the control unit is configured to move a region on which the image is projected in accordance with the movement of the low-brightness region.

7. The projector device according to claim 1, further comprising a notifying unit for notifying, if the low-brightness region lies outside of the projection surface, an instruction to move the projection surface to include the low-brightness region.

8. The projector device according to claim 1, wherein
the control unit is configured to change, in accordance with a shape of the low-brightness region, at least one of
a direction in which the image is projected,
a size of the image to be projected, and
a shape of the image to be projected.

9. The projector device according to claim 1, wherein
the control unit is configured to cause an interruption in the image projection by the image projecting unit to acquire the brightness information of the regions included in the projection surface during the interruption.

10. The projector device according to claim 1, wherein
the control unit is configured to acquire the brightness information of the regions included in the projection surface before a start of image projection by the image projecting unit.

11. The projector device according to claim 1, further comprising an image taking unit for acquiring an image of the projection surface, wherein
the control unit acquires, based on the image of the projection surface acquired by the image taking unit, the brightness information of regions included in the projection surface.

12. A projector device comprising:
an image projecting unit for projecting an image; and
a control unit for acquiring information about a region of shadow projected on a projection surface on which the image projecting unit can project the image, and for causing the image projecting unit to project the image on the region of shadow based on the information about the region of shadow.

13. The projector device according to claim 12, wherein, if the information is acquired indicating that there are two or more regions of shadow,
the control unit causes the image projecting unit to project the image on the largest region of shadow.

14. The projector device according to claim 12, wherein, when the region of shadow is moved during image projection,
the control unit moves a region on which the image is projected in accordance with the movement of the region of shadow.

15. The projector device according to claim 12, wherein
the control unit acquires information indicative of a position of a light source and acquires, based on a relation between the position of the light source and a position of the projector device, the information about the region of shadow projected on the projection surface.

16. A projecting method executed by a projector device including an image projecting unit and an information acquiring unit, the projecting method comprising:
acquiring, by the information acquiring unit, brightness information of regions included in a projection surface on which the image is projectable by the image projecting unit; and determining a projection region on which the image is to be projected by the image projecting unit based on the brightness information of the regions,
wherein the projection region is a low-brightness region, among the regions, whose brightness is lower than that of another region.

* * * * *